Patented Mar. 20, 1951

2,545,880

UNITED STATES PATENT OFFICE 2,545,880

NONPHOSPHORESCENT CALCIUM SILICATE PHOSPHOR CONTAINING INDIUM

Herman C. Froelich, Cleveland Heights, Ohio, assignor to General Electric Company, a corporation of New York No Drawing. Application February 27, 1950, Serial No. 146,639

6 Claims. (Cl. 252—301.4)

My invention relates to fluorescent materials, or phosphors.

Phosphors of calcium silicate activated with both lead and manganese or with manganese alone are well known. Both of these materials are phosphorescent to a degree, and the lead and manganese activated species is characterized by extraordinarily bright and persistent phosphorescence which is excited, for example, by the 1849 Å. radiation of a mercury discharge.

For some lighting applications lamps with relatively long phosphorescence are not desirable, and it is an object of my invention to modify the phosphors by the addition of an ingredient which will inhibit phosphorescence. It is another object of my invention to inhibit phosphorescence of such materials without appreciably reducing the fluorescent brightness.

According to my invention, I have discovered that phosphors of calcium silicate activated with lead and manganese or with manganese alone are rendered non-phosphorescent without reducing fluorescent brightness by the incorporation therein of a small amount of indium. While certain other metals such as copper, samarium, thallium and cobalt inhibit phosphorescence, they do so only with considerable loss of fluorescent brightness. For instance, copper is fully effective only at concentrations of the order of .1 per cent or more but there is an accompanying reduction in fluorescent brightness to 70 per cent or less of the original brightness. On the other hand, concentrations of .01 per cent to 1 per cent by weight of indium in the total composition of the finished phosphor are effective, the preferred optimum concentration being in the region of .1 per cent by weight of the total composition.

Indium is therefore unique in inhibiting phosphorescence without impairing fluorescent brightness as shown by the results listed in the following table for a number of samples which were prepared under identical conditions except for the incorporation of the stated amounts of indium:

| Indium Addition in Parts/Million | Brightness in Per Cent of a Standard | Degree of Phosphorescence |
|---|---|---|
| 0 | 110 | Very Strong. |
| 10 | 108 | Strong. |
| 100 | 110 | Weak. |
| 1,000 | 112 | None. |
| 10,000 | 88 | Do. |

Similar results are obtained with the species containing manganese alone as activator, the material containing indium exhibiting no phosphorescence or greatly reduced phosphorescence after excitation by cathode rays.

The preparation of the non-phosphorescent material in accordance with the invention may be the same as that disclosed in the prior art (for example, British Patent 577,694) for the normal phosphor except that indium is added to the batch. However, one of the several known methods should be chosen which does not make use of chloride as a flux for the reason that indium chloride might form by metathesis and would be lost by volatilization since it sublimes at low temperatures (440° C.). However, fluoride, nitrate, sulphate, carbonate and similar compounds may be used.

To give one specific example, a ball-milled mixture of 50 grams $CaCO_3$, 40 grams silicic acid (91% $SiO_2$), 3.1 grams $MnCO_3$, 1.8 grams PbO and 1.7 grams $CaF_2$ is wet down with water to form a paste to which is added a water solution of about 0.21 gram indium nitrate

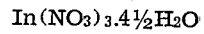

$$In(NO_3)_3.4\tfrac{1}{2}H_2O$$

(Solvents other than water may, of course, be used, e. g., methanol). The well-mixed paste is dried, crushed and sieved, then fired in air on a quartz tray for 15 hours at 1160° C. After cooling and sieving the powder is ready for use.

The species of calcium silicate activated with manganese alone may be prepared in the same manner by merely omitting the PbO in the above example.

It may also be noted that phosphors with increasing indium content showed progressively decreasing infrared stimulability. The latter is quite strong in phosphors without indium, after excitation by very short ultraviolet radiation such as the 1849 Å. line of the mercury spectrum. Apparently indium destroys the deep lying traps which are excited by radiation of 1849 Å. and higher quanta excitation.

What I claim as new and desire to secure by Letters Patent of the United States is:

1. A luminescent material consisting essentially of calcium silicate activated with metal of the group consisting of manganese alone and mixtures of manganese and lead, and an inhibitor of phosphorescence consisting of indium in an amount of about .01 to 1 per cent by weight of the total composition.

2. A luminescent material consisting essentially of calcium silicate activated with metal of the group consisting of manganese alone and mixtures of manganese and lead, and an inhibitor of phosphorescence consisting of indium in an amount of about .1 per cent by weight of the total composition.

3. A luminescent material consisting essentially of calcium silicate activated with manganese and lead, and an inhibitor of phosphorescence consisting of indium in an amount of about .01 to 1 per cent by weight of the total composition.

4. A luminescent material consisting essentially of calcium silicate activated with manganese and lead, and an inhibitor of phosphorescence consisting of indium in an amount of about .1 per cent by weight of the total composition.

5. A luminescent material consisting essentially of calcium silicate activated with manganese and an inhibitor of phosphorescence consisting of indium in an amount of about 0.1 to 1 per cent by weight of the total composition.

6. A luminescent material consisting essentially of calcium silicate activated with manganese and an inhibitor of phosphorescence consisting of indium in an amount of about .1 per cent by weight of the total composition.

HERMAN C. FROELICH.

REFERENCES CITED

The following references are of record in the file of this patent:

UNITED STATES PATENTS

| Number | Name | Date |
| --- | --- | --- |
| 2,299,510 | Steadman | Oct. 20, 1942 |

OTHER REFERENCES

Kroger, "Some Aspects of the Luminescence of Solids," 1948, Elsevier Publishing Company.

Leverenz, "Luminescence of Solids," 1950, John Wiley and Sons, Inc.